(12) United States Patent
Queguiner et al.

(10) Patent No.: US 10,537,117 B2
(45) Date of Patent: Jan. 21, 2020

(54) FOAMING DAIRY COMPOSITIONS

(71) Applicant: COMPAGNIE GERVAIS DANONE, Paris (FR)

(72) Inventors: Claire Queguiner, Fontenay Aux Roses (FR); Sébastien Mercky, Courcouronnes (FR); Eric Rodriguez, Egly (FR)

(73) Assignee: COMPAGNIE GERVAIS DANONE, Paris (FR)

( * ) Notice: Subject to any disclaimer, the term of this patent is extended or adjusted under 35 U.S.C. 154(b) by 0 days.

(21) Appl. No.: 15/540,844

(22) PCT Filed: Dec. 31, 2015

(86) PCT No.: PCT/EP2015/081467
§ 371 (c)(1),
(2) Date: Jun. 29, 2017

(87) PCT Pub. No.: WO2016/107926
PCT Pub. Date: Jul. 7, 2016

(65) Prior Publication Data
US 2017/0354161 A1 Dec. 14, 2017

(30) Foreign Application Priority Data

Dec. 31, 2014 (WO) .................. PCT/IB2014/003144

(51) Int. Cl.
*A23C 9/152* (2006.01)
*A23C 9/13* (2006.01)
*A23P 30/40* (2016.01)

(52) U.S. Cl.
CPC .......... *A23C 9/1524* (2013.01); *A23C 9/1307* (2013.01); *A23C 9/1526* (2013.01); *A23P 30/40* (2016.08)

(58) Field of Classification Search
CPC .............................. A23P 30/40; A23C 9/1307
USPC ................... 426/52, 115, 580, 583, 590, 656
See application file for complete search history.

(56) References Cited

U.S. PATENT DOCUMENTS

| 4,374,155 A | 2/1983 | Igoe et al. |
|---|---|---|
| 6,767,575 B1 | 7/2004 | Huss et al. |
| 2005/0095317 A1 | 5/2005 | Queguiner et al. |

FOREIGN PATENT DOCUMENTS

| DE | 19906379 A1 | 8/2000 |
|---|---|---|
| WO | WO 00/49885 A1 | 8/2000 |

(Continued)

OTHER PUBLICATIONS

"Becher :: Joghurt :: Folie :: Joghurtbecher :: Druck:: Iml :: Kärnten :: Spittal/Drau," http://archive-at-2013.com/open-archive/3173024/2013-11-17/http://www.volpini.at/en/produkte/trockenoffset/75mm_125g.html, XP055203009, Nov. 17, 2013, 1 page.

(Continued)

*Primary Examiner* — Helen F Heggestad
(74) *Attorney, Agent, or Firm* — Birch, Stewart, Kolasch & Birch LLP

(57) ABSTRACT

The present invention relates to a product comprising:
a container (1) having a volume Vc, sealed by a sealing (6), and
a dairy composition (2), having a volume Vd, which is comprised in the sealed container, characterized in that the dairy composition comprises caseinomacropeptide (CMP) and 0.60<Vd/Vc<0.72. The dairy composition is preferably a fermented dairy composition. Preferably the dairy composition or fermented dairy composition comprises CMP at a concentration of at least 0.3%. Further claimed is a fermented dairy composition comprising CMP as well as the use of CMP as a foaming agent in fermented dairy compositions.

14 Claims, 1 Drawing Sheet

(56) References Cited

FOREIGN PATENT DOCUMENTS

| WO | WO 03/070009 A1 | | 8/2003 |
|---|---|---|---|
| WO | WO 2007/095969 A1 | | 8/2007 |
| WO | WO 2010/123351 A1 | | 10/2010 |
| WO | WO2015/059243 | * | 4/2015 |
| WO | WO 2015/059243 A1 | | 4/2015 |
| WO | WO2015/059248 | * | 4/2015 |
| WO | WO 2015/059248 A1 | | 4/2015 |
| WO | 2016/066788 | * | 6/2016 |

OTHER PUBLICATIONS

International Search Report and Written Opinion of the International Searching Authority (Forms PCT/ISA/210 and PCT/ISA/237) issued in International Application No. PCT/EP2015/081467 dated Feb. 11, 2016.

Krasaekoopt et al., "Production of Yogurt Powder Using Foam-Mat Drying," AU Journal of Technology, vol. 15, No. 3, Jan. 2012, pp. 166-171.

Marshall, "Casein Macropeptide From Whey—A New Product Opportunity," CSIRO Food Research Quarterly, vol. 51, Nos. 1 & 2, XP002044765, 1991, pp. 86-91.

Martin-Diana et al., "Emulsifying properties of whey protein concentrate and caseinomacropeptide of cow, ewe and goat," Milchwissenschaft, vol. 60, No. 4, 2005, pp. 363-367.

Neelima et al., "Chemical and functional properties of glycomacropeptide (GMP) and its role in the detection of cheese whey adulteration in milk: A review," Diary Science & Technology, vol. 93, XP002742387, 2013, pp. 21-43.

* cited by examiner

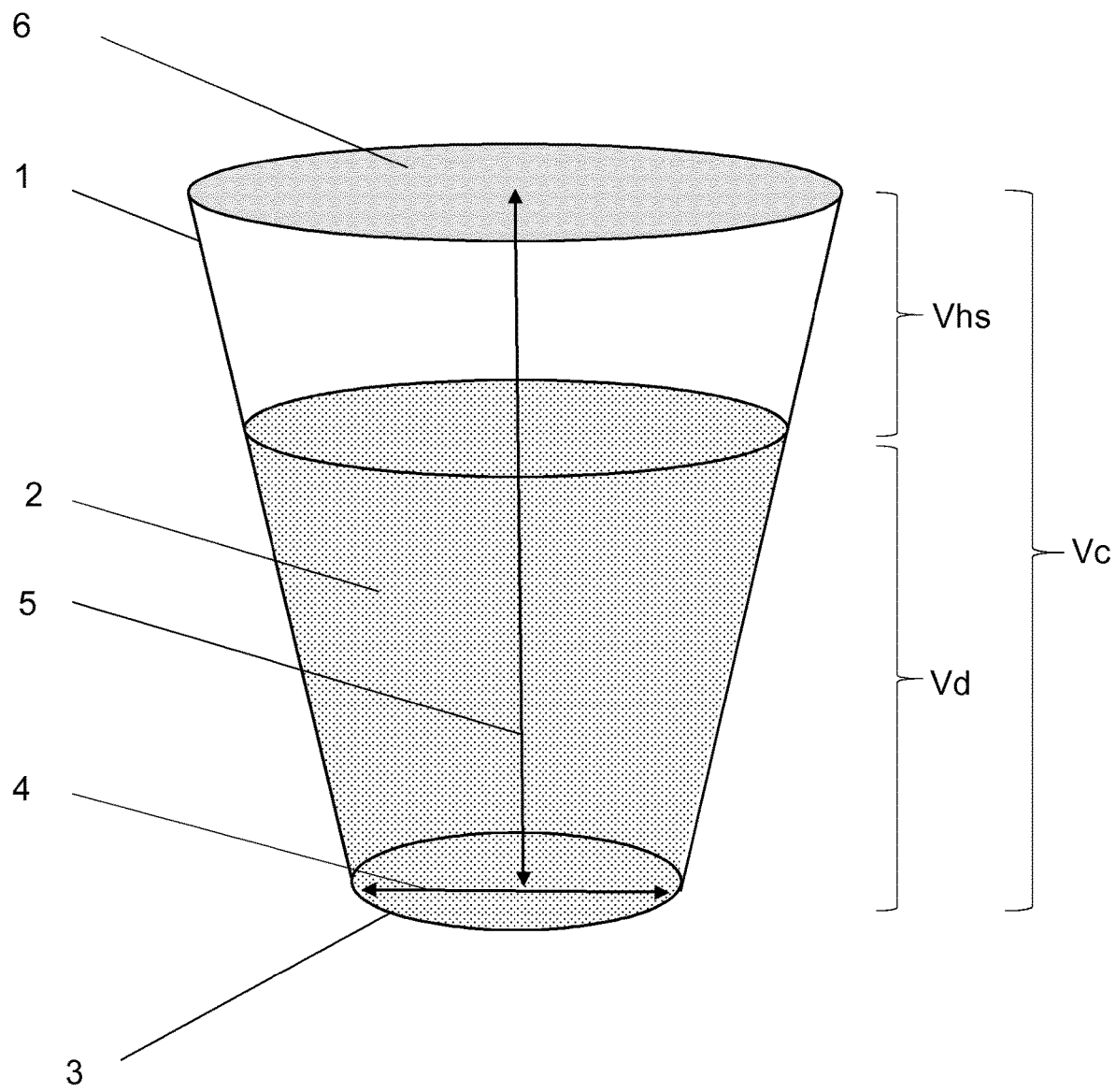

FOAMING DAIRY COMPOSITIONS

FIELD OF THE INVENTION

The present invention relates to foaming dairy compositions, in particular foaming fermented dairy compositions, as well as products comprising them, and methods for making the same. The dairy compositions are more particularly drink dairy compositions.

TECHNICAL BACKGROUND

Relatively few foaming fermented dairy compositions intended for human consumption have been described to date, in spite of their clear commercial potential.

Thus, Krasaekoopt & Bhatia (2012) *AU Journal of Technology* 15:166-171 describe the production of yogurt foam using methylcellulose and egg albumin as foaming agents. However, the yogurt foam thus produced is intended for yogurt powder production and is not intended for human consumption as such. Besides, when yogurt powder was used to prepare a drinking yogurt, orange flavor was added, thereby making difficult to assess the organoleptic impact of the foaming agents used on the drinking yogurt, which was "moderately liked" by a testing panel.

In addition, U.S. Pat. No. 4,374,155 describes a composition containing yogurt which, upon manual shaking, produces a drink containing entrapped air having a milk shake appearance. The composition contains yogurt and milk in a yogurt:milk ratio of 80:20 to 53:47, a soya protein whipping agent (i.e. foaming agent) and a stabilizer. However, the soya protein whipping agent has not been demonstrated to be a suitable foaming agent for compositions consisting only of yogurt. Besides, the organoleptic impact of the whipping agent on the obtained composition is not reported.

Accordingly, there is a need for alternative foaming agents, which could be used in fermented dairy compositions and which would not be detrimental to their organoleptic properties.

Caseinomacropeptide (CMP) is a glycopeptide which is released in whey from the action of chymosin on milk κ-casein, essentially during the milk-clotting process of cheese-making. CMP is glycosylated and is therefore also named caseinoglycomacropeptide (CGMP) or glycomacropeptide (GMP). In this regard, there is a significant difference in the non-peptide part of CMP from species such as cow, ewe or goat. In contrast, the amino acid composition of CMP from these species is very similar.

SUMMARY OF THE INVENTION

The present invention arises from the unexpected discovery, by the present inventors, that caseinomacropeptide (CMP) could be used as a foaming agent in fermented dairy compositions. Besides, advantageously and unexpectedly also, foaming fermented dairy compositions prepared with CMP have excellent organoleptic properties and their foaming properties are maintained for at least 28 days after preparation.

Thus, the present invention relates to a product comprising:
- a container having a volume Vc, sealed by a sealing, and
- a dairy composition, having a volume Vd, which is comprised in the sealed container, characterized in that the dairy composition comprises caseinomacropeptide (CMP) and $0.6 \leq Vd/Vc \leq 0.72$.

The present invention also relates to a process of preparing a product as defined above, comprising the steps of introducing the dairy composition in the container and then sealing the container.

The present invention also relates to a method of using the product as defined above, comprising:
a) shaking the product, to foam the dairy composition,
b) removing the sealing or making an aperture in the sealing of the container,
c) transferring the foamed dairy composition to a human mouth.

The present invention also relates to a fermented dairy composition which comprises CMP.

The present invention also relates to a method of preparation of a fermented dairy composition from a dairy composition, comprising the steps of:
- optionally heat treating the dairy composition;
- fermenting the dairy composition by at least one lactic acid bacteria;
- optionally adding a slurry to the fermented dairy composition;

wherein CMP is added to the dairy composition.

The present invention also relates to the use of CMP as a foaming agent in fermented dairy compositions.

BRIEF DESCRIPTION OF THE FIGURE

FIG. 1 represents an embodiment of the product according to the invention. The product comprises a container (1) having a volume Vc, sealed by a sealing (6), and a dairy composition (2), having a volume Vd, which is comprised in the sealed container. The container of the represented embodiment of the product according to the invention comprises a flat base (3) on which the container is intended to stand and the largest dimension of the flat base (4) is smaller than the largest dimension of the container which is orthogonal to the flat base (5). Vhs, represents the volume of the head-space, i.e. the part of the container not occupied by the dairy composition. Vhs=Vc−Vd.

DETAILED DESCRIPTION OF THE INVENTION

As intended herein, a "dairy composition" relates to a milk-based composition suitable for animal consumption, in particular human consumption. Preferably, the dairy composition according to the invention comprises or derives (in particular by fermentation) from a composition containing from 30 to 100% (w/w) milk, more preferably from 50 to 100% (w/w) milk and even more preferably from 70 to 100% (w/w) milk. As intended herein, the expression "x % (w/w)" is considered equivalent to "x g per 100 g". Preferably also, the dairy composition according to the invention comprises or derives (in particular by fermentation) from a composition essentially consisting of milk or consisting only of milk. As intended herein "milk" preferably relates to vegetable or animal milk, more preferably to goat, ewe, or cow milk and most preferably to cow milk.

Preferably, the dairy composition according to the invention is a drink dairy composition.

Preferably, the dairy composition according to the invention is a fermented dairy composition, more preferably a fermented milk and most preferably a yogurt. The dairy composition according to the invention is more particularly a drink fermented dairy composition, more preferably a drink fermented milk and most preferably a drink yogurt.

As intended herein, a "fermented dairy composition" is derived from a dairy composition according to the invention by the acidifying action of at least one lactic acid bacterium, which may be comprised in a ferment, a culture or a starter.

The lactic acid bacterium according to the invention preferably belongs to an *Aerococcaceae, Carnobacteriaceae, Enterococcaceae, Lactobacillaceae, Leuconostocaceae, Streptococcaceae* or *Bifidobacteriaceae* family and more preferably to an *Aerococcus, Carnobacterium, Enterococcus, Lactobacillus, Lactococcus, Leuconostoc, Oenococcus, Pediococcus, Streptococcus, Tetragenococcus, Vagococcus, Weissella* or *Bifidobacterium* genus. More preferably, the lactic acid bacterium according to the invention belongs to a *Lactobacillus brevis, Lactobacillus buchneri, Lactobacillus casei, Lactobacillus curvatus, Lactobacillus delbruckei*, in particular *L. delbruckei* supsb. *bulgaricus* or *lactis, Lactobacillus diolivorans, Lactobacillus fermenturn, Lactobacillus fructivorans, Lactobacillus helveticus, Lactobacillus hilgardii, Lactobacillus jensenii, Lactobacillus kunkeei, Lactobacillus mali, Lactobacillus nagelii, Lactobacillus paracasei*, en particulier *L. paracasei* subsp. *paracasei, Lactobacillus plantarum, Lactobacillus vini, Lactobacillus rhamnosus, Streptococcus thermophilus, Streptococcus lactis, Streptococcus raffinolactis, Streptococcus cremoris, Bifidobacterium adolescentis, Bifidobacterium animalis, Bifidobacterium bifidum, Bifidobacterium breve, Bifidobacterium infantis, Bifidobacterium lactis*, or *Bifidobacterium longum* species.

One or more lactic acid bacteria can be used for obtaining a fermented dairy composition according to the invention. Thus, in a preferred embodiment, an association of *Streptococcus thermophilus* and *Lactobacillus delbrueckii* subsp. *bulgaricus* is used for obtaining a fermented dairy composition according to the invention. This latter association is often referred to as a yogurt ferment or symbiosis.

In a preferred embodiment, the lactic acid bacterium is a probiotic bacteria.

The expressions "fermented milk" and "yogurt" have the usual meanings attributed to them in the dairy industry.

By way of example, French decree n°88-1203 of Dec. 30, 1988 (revised on Dec. 26, 2012) reserves the denomination "fermented milk" to a dairy product prepared with skimmed or non-skimmed milks or with skimmed or non-skimmed concentrated or powdered milks, possibly enriched in milk constituents, having undergone a heat treatment at least equivalent to pasteurization, sown with microorganisms belonging to the characteristic species of each product. The coagulation of the fermented milks shall not be obtained by other means than those which result from the activity of the microorganisms used. The quantity a free lactic acid that the fermented milks contain shall not be below 0.6 g per 100 g at the time of selling and the protein content in respect of the milky part shall not be below that of normal milk.

The same decree reserves the denomination "yogurt" to a fermented milk obtained by the development of the sole specific thermophilic lactic acid bacteria named *Lactobacillus bulgaricus* (also named *Lactobacillus delbruckei* subsp. *bulgaricus*) and *Streptococcus thermophilus*, which shall be sown together and be found alive in the finished product, in an amount of at least 10 million bacteria per gram in respect of the milky part. The quantity of free lactic acid that the yogurt contains shall not be below 0.7 g per 100 g at the time of selling.

The dairy composition, in particular the fermented dairy composition, according to the invention can typically have a protein content (including CMP) of from 0.5% to 20% by weight, such as from 1 to 10% by weight, notably from 2% to 5% by weight, in particular from 3% to 4% by weight.

The "total protein content" of a product corresponds to the weight of the proteins present in the product relatively to the total weight of the product. The total protein content is expressed as a weight percentage.

The total protein content can be measured by Kjeldahl analysis (NF EN ISO 8968-1) as the reference method for the determination of the protein content of dairy products based on measurement of total nitrogen. The method is described in both AOAC Method 991.20 (1) and international Dairy Federation Standard (IDF) 20B:1993.

If the total protein content is known for all the ingredients used to prepare the product, the total protein content of the product can be calculated from these data.

The dairy composition, in particular the fermented dairy composition, according to the invention, may comprise secondary ingredients such as fruits, vegetables, sugars, flavors, starch, thickeners, or stabilizers.

In particular, the above-mentioned decree also provides that fermented milks may be added with the following products: aromatic extracts, natural aromas, as well as, in the limit of 30% in weight of finished product, sugars and other alimentary ingredients which yield a specific flavor.

In a particular embodiment, the dairy composition, in particular the fermented dairy composition, according to the invention comprises at least one foaming agent in addition to CMP. In another particular embodiment, the dairy composition, in particular the fermented dairy composition, according to the invention does not comprise any other foaming agent in addition to CMP.

Preferably, the dairy composition according to the invention has a pH equal to or lower than 5, more preferably between 3.5 and 4.5.

Preferably, the composition has a viscosity of lower than 200 mPa·s, more preferably lower than 100 mPa·s and most preferably lower that 60 mPa·s, at 10° C., at a shear rate of 64 s$^{-1}$. These viscosity values correspond advantageously to the viscosity of the dairy composition according to the invention at any stage of its shelf life, notably until 4 weeks, such as until 6 weeks, after its preparation. In the framework of the present invention, the viscosity is preferably measured at 10° C. with a coaxial cylinder viscometer after 10 s of shearing at a shear rate of 64 s$^{-1}$. Preferably also, the dairy composition according to the invention is a drink fermented dairy composition, more preferably a drink fermented milk and most preferably a drink yogurt.

Preferably also, the dairy composition, in particular the fermented dairy product, according to the invention, or the product according to the invention, is stored at a temperature of from 1° C. to 10° C., notably 4 to 8° C.

As intended herein, caseinomacropeptide (CMP) is considered a synonym of glycomacropeptide (GMP) or caseinoglycomacropeptide (CGMP). CMP is well known by one of skill in the art. CMP is usually released in whey from the action of chymosin on milk κ-casein, essentially during the milk-clotting process of cheese-making. Thus CMP essentially consists of amino-acids 106-169 of milk κ-casein. It is preferred that CMP originates from cow, ewe or goat milk, in particular from cow milk.

The dairy composition, in particular the fermented dairy composition, according to the invention, comprises CMP.

CMP is preferably added or incorporated to the dairy composition, in particular the fermented dairy composition, according to the invention, in the form of (i) a whey preparation, such as whey powder, a whey protein preparation, in particular a whey protein isolate (WPI), a whey protein hydrolysate (WPH) or a whey protein concentrate (WPC), or combinations thereof, or of (ii) a preparation isolated, concentrated or purified therefrom. Commercial CMP preparations which can be added or incorporated to dairy compositions, in particular fermented dairy compositions, according to the invention, notably encompass Lacprodan® DI-9224, Lacprodan® CGMP-10 or Lacprodan® CGMP-20, all from Arla Food Ingredients.

Preferably, the dairy composition, in particular the fermented dairy composition, according to the invention, comprises CMP at a concentration of at least 0.1 or 0.2% (w/w) or else at a concentration of at least 0.3, 0.5, 0.75, 1, 2, 5 or 10% (w/w). Preferably also, the dairy composition, in particular the fermented dairy composition according to the invention, comprises CMP at a concentration of 20, 10, 5 or 2% (w/w) at the most or else at a concentration of 1% (w/w) at the most. According to a particular embodiment, the dairy composition, in particular the fermented dairy composition, according to the invention, comprises CMP at a concentration comprised between 0.1 and 5% (w/w), in particular comprised between 0.2 and 2% (w/w), more particularly comprised between 0.3 and 1% (w/w).

According to the present invention CMP is a foaming agent, i.e. CMP imparts increased foaming properties to the dairy composition, in particular the fermented dairy composition, according to the invention, which comprises it. As intended herein "increased foaming properties" are considered equivalent to "an increased capacity to incorporate air" or to "increased foam expansion". As will be clear to one of skill in the art the "increase" in foaming properties of a dairy composition, in particular a fermented dairy composition, according to the invention, which comprises CMP, is relative to the same composition without added CMP under the same conditions of determination of the foaming properties. As intended herein a "foaming agent" is considered equivalent to a "whipping agent". It is understood that foaming agents increase the interface between air and a liquid or fluid composition which comprises them, thereby facilitating the incorporation of air in the composition upon shaking or agitation thereof.

The foaming properties of a dairy composition, in particular a fermented dairy composition, according to the invention can be determined by measuring the volume Vi of a unshaken sample of a dairy composition, in particular a fermented dairy composition, according to the invention, shaking the sample, and measuring the volume Vf of the shaken sample. The formula (Vf−Vi)/Vi then yields a value of the foaming properties of the dairy composition, in particular a fermented dairy composition, according to the invention. In order to standardize the shaking step of the method of determination of the foaming properties of a dairy composition, it is preferred that it is implemented by performing 2 up-down movements over a distance of 30-35 cm per second during 20 seconds. Using this method of determination of foaming properties, the dairy compositions, in particular the fermented dairy compositions, according to the invention, preferably have foaming properties of from 10% to 50%, more preferably of from 20% to 40% and most preferably of from 30% to 35%.

The Vd/Vc ratio according to the invention is specifically adapted to the foaming properties of the dairy composition, in particular the fermented dairy composition, according to the invention. In other words, the head-space of the product according to the invention, that is the part of the container not occupied by the dairy composition, in particular the fermented dairy composition, according to the invention, has a volume Vhs sufficient to accommodate the increase in volume of the dairy composition, in particular the fermented dairy composition, according to the invention, due to its foaming upon shaking of the product according to the invention. Preferably, $0.65 \leq Vd/Vc \leq 0.70$. Symmetrically, it is preferred that $0.28 \leq Vhs/Vc \leq 0.40$ and in particular that $0.30 \leq Vhs/Vc \leq 0.35$.

The fermented dairy composition according to the invention can be prepared from a dairy composition by a method comprising the steps of:
(a) optionally heat treating the dairy composition;
(b) fermenting the dairy composition by at least one lactic acid bacteria;
(c) optionally adding a slurry to the fermented dairy composition;
wherein CMP is added to the dairy composition.

Advantageously, the method to prepare the fermented dairy composition according to the invention comprises an additional step (d) of smoothing the fermented dairy composition, preferably after step (b) (or after step (c) when a slurry is added to the fermented dairy composition).

The fermented dairy composition thus obtained will be advantageously cooled to its storage temperature, and more particularly to a temperature comprised between 1 and 10° C., notably comprised between 4 and 8° C.

According to a particular embodiment, the fermented dairy composition according to the invention is prepared from a dairy composition by a method comprising the steps of:
(a) optionally heat treating the dairy composition;
(b) fermenting the dairy composition by at least one lactic acid bacteria;
(c) optionally adding a slurry to the fermented dairy composition;
(d) smoothing the fermented dairy composition;
(e) cooling the fermented dairy composition to its storage temperature, and more particularly to a temperature comprised between 1 and 10° C., notably comprised between 4 and 8° C.;
wherein CMP is added to the dairy composition.

As intended in the method of preparation according to the invention, CMP can be added to the dairy composition at any step of the method, either before, during or after the fermenting step. In this regard, CMP can be added with the slurry, which may further comprise sugars, such as sucrose, and any other secondary ingredient as previously defined. However, it is preferred that CMP is added to the dairy composition prior to the fermenting step, in particular before the heat treating step. As will be clear to one of skill in the art, the heat treating step aims at killing microorganisms which may be present in the dairy composition. Preferably, it at least amounts to a pasteurization.

Besides, CMP is added in amounts such that the fermented dairy composition yielded by the method of preparation according to the invention preferably comprises CMP at a concentration of at least 0.1 or 0.2% (w/w) or else at a concentration of at least 0.3, 0.5, 0.75, 1, 2, 5 or 10% (w/w). Preferably also, the fermented dairy composition yielded by the method of preparation according to the invention comprises CMP at a concentration of 20, 10, 5 or 2% (w/w) at the most or else at a concentration of 1% (w/w) at the most. According to a particular embodiment, the fermented dairy composition yielded by the method of preparation according to the invention comprises CMP at a concentration comprised between 0.1 and 5% (w/w), in particular comprised between 0.2 and 2% (w/w), more particularly comprised between 0.3 and 1% (w/w).

The container and the sealing of the product are made of any material suitable for contacting and stocking dairy products, in particular fermented dairy products according to the invention, intended for animal or human consumption. The sealing of the container is preferably tight, i.e. it does not leak when the product according to the invention is shaken. Besides, the sealing can be removed or an aperture can be made into it, to yield access to the dairy composition, in particular the fermented dairy composition, according to the invention. Preferably, the container according to the invention comprises a flat base on which the container is intended to stand and the largest dimension of the flat base is smaller than the largest dimension of the container which is orthogonal to the flat base. In other words, the container is higher than larger.

EXAMPLES

Ingredients

Four ingredients (I1, I2, I3 and I4), with varying content in CMP, have been used. I1 is a concentrate or an isolate of native whey proteins extracted directly from milk, and not from whey. I2 is a whey protein isolate. I3 and I4 are compositions concentrated in CMP processed from whey.

The composition of the ingredients is shown in the following Table 1:

TABLE 1

| | constitution of the ingredients | | | |
|---|---|---|---|---|
| Ingredient References (Provider) | I1 Prolacta ® 90 (Lactalis) | I2 Lacprodan ® DI-9224 (Aria Food Ingredients) | I3 Lacprodan ® CGMP-10 (Aria Food Ingredients) | I4 Lacprodan ® CGMP-20 (Aria Food Ingredients) |
| Powder protein content (g/100 g powder, NT × 6.38) | 90 | 85 | 82.5 | 77 |
| Dry matter protein content (g/100 g dry matter, NT × 6.38) | 95 | 90 | 85 | 81 |
| Moisture (g/100 g powder) | 6 | 5.0 | 5.0 | 5.5 |
| NPN × 6.38 (g/100 g powder) | 0.1 | 0.1 | 0.1 | 0.1 |
| Fat (g/100 g powder) | 0.4 | 0.2 | 0.5 | 1.0 |
| Ash (g/100 g powder) | 3 | 5 | 6.5 | 9.0 |
| Lactose (g/100 g powder) | 3.0 | 0.2 | 2.0 | 1.0 |
| Calcium (mg/100 g powder) | 300 | 100 | 1700 | 100 |
| Chloride (mg/100 g powder) | 180 | 50 | 50 | <100 |
| Potassium (mg/100 g powder) | 400 | 1300 | 100 | 2000.0 |
| Phosphorus (mg/100 g powder) | 200 | 200 | 500 | 500 |
| Sodium (mg/100 g powder) | 100 | 500 | 400 | 1500 |
| CMP (g/100 g protein) | 0 | 15% | 65% | 95% |
| CMP (g/100 g powder) | 0% | 12.7% | 53.6% | 73.1% |
| Whey proteins (g/100 g powder) [1] | 89.9% | 72.2% | 28.8% | 3.8% |

[1] Whey proteins do not comprise CGMP

Example 1

Two-step Preparation of Foaming Fermented Dairy Products 1.1. A dairy mix with the following composition is prepared:

TABLE 2

| dairy mix composition | |
|---|---|
| Ingredients | g/100 g mix |
| Non-fat cow milk | 73.98% |
| Cream | 3.66% |
| Sucrose | 1.25% |
| Water | 21.12% |

The mix is let to hydrate for 60 min before being submitted to a heat treatment at 95° C. during 5 min and to homogenization at a pressure of 200 bar. Yogurt ferments (*Streptococcus thermophilus*+*Lactobacillus delbrueckii* subsp. *bulgaricus*) are then added to the homogenized mix at a concentration of 0.02% (w/w) and fermentation is conducted at 42° C. during 5 hours. The fermented dairy mix is stirred at a pH of 4.43 and further smoothed by filtration.

1.2. Slurries with varying concentrations of CMP are prepared by mixing ingredients I1, I2, I3, or I4 with sucrose and water under gentle agitation during 90 min.

TABLE 3

| control slurry composition | |
|---|---|
| Control slurry (g/100 g) | |
| Sucrose | 40.0% |
| Water | 60.0% |

TABLE 4

| slurry composition | |
|---|---|
| Slurry 1 | |
| I3 | 6.1% |
| Saccharose | 40.0% |
| Eau | 53.9% |

TABLE 5

| slurry composition | |
|---|---|
| Slurry 2 | |
| I4 | 6.5% |
| Saccharose | 40.0% |
| Eau | 53.5% |

TABLE 6 slurry composition
Slurry 3

| | |
|---|---|
| I1 | 5.6% |
| Saccharose | 40.0% |
| Eau | 54.4% |

TABLE 7 slurry composition
Slurry 4

| | |
|---|---|
| I2 | 5.9% |
| Saccharose | 40.0% |
| Eau | 54.1% |

1.3. The slurries are incorporated in the fermented dairy mix in a slurry/fermented mix ratio (w/w) of 10/90 or 20/80 and mixed together in a round flask before being smoothed with a mixer (65 Hz, Ystral, Germany).

The foaming properties (i.e. the volume of incorporated air) of the fermented dairy compositions incorporating the slurries are then determined. Briefly, 6 mL (Vi) of the fermented dairy compositions incorporating the slurries are poured into 10 mL-graduated cylinders which are sealed and vigorously agitated (2 up-down movements over a distance of 30-35 cm per second during 20 seconds). The cylinder are then rested for 30 seconds before the volume (Vf) of the agitated fermented dairy compositions incorporating the slurries is measured. The volume of incorporated air is then calculated as 100×(Vf−Vi)/Vi.

TABLE 8

Foaming properties of the fermented dairy compositions incorporating the slurries

| | Slurry amount (g/100 g final mix) | CMP (%, w/w in final mix) | Whey proteins originating from the slurry (%, w/w in final mix) | Volume of incorporated air (%) |
|---|---|---|---|---|
| Control slurry | 10% | — | — | 5% |
| Slurry 1 | 10% | 0.33% | 0.18% | 11% |
| Slurry 2 | 10% | 0.48% | 0.03% | 15% |
| Slurry 3 | 10% | 0.00% | 0.50% | 3% |
| Slurry 4 | 10% | 0.08% | 0.43% | 7% |
| Slurry 1 | 20% | 0.65% | 0.35% | 28% |
| Slurry 2 | 20% | 0.95% | 0.05% | 32% |
| Slurry 3 | 20% | 0.00% | 1.00% | 5% |

It can be seen that concentrations of CMP of as little as 0.08% (g/100 g of final mix) endow the fermented dairy product comprising CMP at such concentrations with increased foaming properties, while native whey proteins (which do not comprise CMP) have essentially no foaming properties. Concentrations of CMP of 0.3% (g/100 g of final mix) and above increased by a factor of at least 2 the foaming properties of fermented dairy product comprising CMP at such concentrations.

Example 2

One-step Preparation of Foaming Fermented Dairy Products

Two dairy mixes directly incorporating sucrose and various amounts of CMP are prepared with the following composition:

TABLE 9 dairy mix composition 1% I3

| Ingredients | g/100 g mix |
|---|---|
| Non-fat cow milk | 64.50% |
| Cream | 2.91% |
| Sucrose | 5% |
| Water | 26.59% |
| I3 | 1.00% |

TABLE 10 dairy mix composition 0.75% I3

| Ingredients | g/100 g mix |
|---|---|
| Non-fat cow milk | 70.74% |
| Cream | 2.90% |
| Sucrose | 5% |
| Water | 20.60% |
| I3 | 0.75% |

The mix is let to hydrate for 90 min before being submitted to a heat treatment at 95° C. during 5 min and to homogenization at a pressure of 200 bar. Yogurt ferments (*Streptococcus thermophilus*+*Lactobacillus delbrueckii* subsp. *bulgaricus*) are then added to the homogenized mix at a concentration of 0.02% (w/w) and fermentation is conducted at 42° C. during 5 hours. The fermented dairy mix is stirred at a pH of 4.43 and further smoothed by filtration.

The foaming properties (i.e. the volume of incorporated air) of the fermented dairy compositions are then determined on the day (D0) the stirred and smoothed fermented dairy mix is obtained, and 14 (D14) and 28 (D28) days after. Briefly, 6 mL (Vi) of the fermented dairy compositions incorporating the slurries are poured into 10 mL-graduated cylinders which are sealed and vigorously agitated (2 up-down movements over a distance of 30-35 cm per second during 20 seconds). The cylinder are then rested for 30 seconds before the volume (Vf) of the agitated fermented dairy compositions incorporating the slurries is measured. The volume of incorporated air is then calculated as 100×(Vf−Vi)/Vi.

TABLE 11

Foaming properties of the fermented dairy compositions directly incorporating CMP

| | CMP (%, w/w in final fermented mix) | Whey proteins originating from the slurry (%, w/w in final fermented mix) | Volume of incorporated air (%) | | |
|---|---|---|---|---|---|
| | | | D0 | D14 | D28 |
| Dairy mix composition 1% I3 | 0.54% | 0.29% | 29% | 31% | 28% |
| Dairy mix composition 0.75% I3 | 0.40% | 0.22% | 24% | 21% | 23% |

Surprisingly, the foaming properties of CMP when directly incorporated in the dairy mix prior to heat treatment and fermentation are even increased with respect to the case when CMP is brought after the fermentation step together with the slurry (Example 1), while it could be expected that CMP would preferentially localize at the water-oil interface rather that at the water-air interface in case of direct incorporation in the unfermented initial dairy mix. Advantageously and unexpectedly, the foaming properties are essentially constant over a period of at least 28 days after the fermented dairy composition has been prepared.

The invention claimed is:

1. A product comprising:
   a container (1) having a volume Vc, sealed by a sealing (6), and
   a fermented dairy composition (2) having a volume Vd, which is comprised in the sealed container,
   characterized in that the dairy composition comprises caseinomacropeptide (CMP) and $0.60 \leq Vd/Vc \leq 0.72$.

2. The product according to claim 1, wherein $0.65 \leq Vd/Vc \leq 0.70$.

3. The product according to claim 1, wherein the container comprises a flat base (3) on which the container is intended to stand and the largest dimension of the flat base (4) is smaller than the largest dimension of the container which is orthogonal to the flat base (5).

4. The product according to claim 1, being stored at a temperature of from 1° C. to 10° C.

5. The product according to claim 1, wherein the dairy composition has a viscosity of lower than 200 mPa·s measured at 10° C. with a coaxial cylinder viscometer after 10 s of shearing at a shear rate of $64$ $s^{-1}$.

6. The product according to claim 1, wherein the dairy composition has a pH equal to or lower than 5.

7. The product according to claim 1, wherein the dairy composition comprises CMP at a concentration of at least 0.3% (w/w).

8. The product according to claim 1, wherein CMP has been added to the dairy composition in the form of a whey protein preparation.

9. A method of using the product according to claim 1, comprising:
   a) shaking the product, to foam the dairy composition (2),
   b) removing the sealing (6) or making an aperture in the sealing (6) of the container (1),
   c) transferring the foamed dairy composition to a human mouth.

10. A method of preparation of a fermented dairy composition from a dairy composition, comprising the steps of:
    optionally heat treating the dairy composition;
    fermenting the dairy composition by at least one lactic acid bacteria;
    wherein CMP is added to the dairy composition prior to the fermenting step, optionally before the heat treating step.

11. The product according to claim 1, wherein the dairy composition is a drink dairy composition.

12. The product according to claim 6, wherein the dairy composition has a pH between 3.5 and 4.5.

13. A method for foaming a fermented dairy composition comprising adding CMP to a dairy composition, before fermenting the dairy composition.

14. The method according to claim 13, wherein the fermented dairy composition is a drink fermented dairy composition.

* * * * *